(12) United States Patent
Kagan et al.

(10) Patent No.: US 9,298,642 B2
(45) Date of Patent: Mar. 29, 2016

(54) SHARING ADDRESS TRANSLATION BETWEEN CPU AND PERIPHERAL DEVICES

(71) Applicant: MELLANOX TECHNOLOGIES LTD., Yokneam (IL)

(72) Inventors: Michael Kagan, Zichron Yaakov (IL); Noam Bloch, Bat Shlomo (IL); Liran Liss, Atzmon (IL); Shachar Raindel, Haifa (IL)

(73) Assignee: MELLANOX TECHNOLOGIES LTD., Yokneam (IL)

( * ) Notice: Subject to any disclaimer, the term of this patent is extended or adjusted under 35 U.S.C. 154(b) by 378 days.

(21) Appl. No.: 13/665,946

(22) Filed: Nov. 1, 2012

(65) Prior Publication Data

US 2014/0122828 A1    May 1, 2014

(51) Int. Cl.
*G06F 12/00* (2006.01)
*G06F 12/10* (2006.01)

(52) U.S. Cl.
CPC .................................. *G06F 12/1081* (2013.01)

(58) Field of Classification Search
CPC .................................................. G06F 12/1081
USPC ....................................................... 711/206
See application file for complete search history.

(56) References Cited

U.S. PATENT DOCUMENTS

| | | | |
|---|---|---|---|
| 5,864,876 A * | 1/1999 | Rossum et al. | 711/206 |
| 5,893,166 A * | 4/1999 | Frank et al. | 711/163 |
| 6,070,219 A * | 5/2000 | McAlpine et al. | 710/263 |
| 6,321,276 B1 | 11/2001 | Forin | |
| 6,766,467 B1 | 7/2004 | Neal et al. | |
| 6,789,143 B2 | 9/2004 | Craddock et al. | |
| 6,981,027 B1 | 12/2005 | Gallo et al. | |
| 7,171,484 B1 | 1/2007 | Krause et al. | |
| 7,263,103 B2 | 8/2007 | Kagan et al. | |
| 7,299,266 B2 | 11/2007 | Boyd et al. | |
| 7,464,198 B2 | 12/2008 | Martinez et al. | |
| 7,475,398 B2 | 1/2009 | Nunoe | |
| 7,548,999 B2 | 6/2009 | Haertel et al. | |
| 7,752,417 B2 | 7/2010 | Manczak et al. | |
| 7,809,923 B2 | 10/2010 | Hummel et al. | |
| 7,921,178 B2 | 4/2011 | Haviv | |
| 8,001,592 B2 | 8/2011 | Hatakeyama | |
| 8,010,763 B2 | 8/2011 | Armstrong et al. | |
| 8,051,212 B2 | 11/2011 | Kagan et al. | |
| 8,255,475 B2 | 8/2012 | Kagan et al. | |

(Continued)

OTHER PUBLICATIONS

U.S. Appl. No. 13/229,772 Notice of Allowance dated Oct. 4, 2013.

(Continued)

*Primary Examiner* — Larry Mackall
(74) *Attorney, Agent, or Firm* — D.Kligler IP Services Ltd.

(57) ABSTRACT

A method for memory access includes maintaining in a host memory, under control of a host operating system running on a central processing unit (CPU), respective address translation tables for multiple processes executed by the CPU. Upon receiving, in a peripheral device, a work item that is associated with a given process, having a respective address translation table in the host memory, and specifies a virtual memory address, the peripheral device translates the virtual memory address into a physical memory address by accessing the respective address translation table of the given process in the host memory. The work item is executed in the peripheral device by accessing data at the physical memory address in the host memory.

20 Claims, 1 Drawing Sheet

(56) References Cited

U.S. PATENT DOCUMENTS

| | | | |
|---|---|---|---|
| 8,447,904 | B2 | 5/2013 | Riddoch |
| 2002/0152327 | A1 | 10/2002 | Kagan et al. |
| 2003/0046530 | A1 | 3/2003 | Poznanovic |
| 2004/0221128 | A1 | 11/2004 | Beecroft et al. |
| 2004/0230979 | A1 | 11/2004 | Beecroft et al. |
| 2005/0097183 | A1* | 5/2005 | Westrelin .................. 709/212 |
| 2007/0011429 | A1 | 1/2007 | Sangili et al. |
| 2007/0061492 | A1 | 3/2007 | Van Riel |
| 2007/0226450 | A1* | 9/2007 | Engbersen et al. ........ 711/203 |
| 2007/0283124 | A1 | 12/2007 | Menczak et al. |
| 2008/0098198 | A1* | 4/2008 | Kawamura et al. ........ 711/206 |
| 2010/0030975 | A1 | 2/2010 | Murray et al. |
| 2010/0095085 | A1 | 4/2010 | Hummel et al. |
| 2010/0217916 | A1 | 8/2010 | Gao et al. |
| 2010/0332789 | A1* | 12/2010 | Sugumar et al. ........... 711/207 |
| 2011/0023027 | A1 | 1/2011 | Kegel et al. |
| 2011/0307646 | A1 | 12/2011 | Lee et al. |
| 2013/0067193 | A1 | 3/2013 | Kagan et al. |
| 2013/0110959 | A1* | 5/2013 | Sharp et al. ................ 709/212 |

OTHER PUBLICATIONS

"Linux kernel enable the IOMMU—input/output memory management unit support", http://www.cyberciti.biz/tips/howto-turn-on-linux-software-iommu-support.html, Oct. 15, 2007.

U.S. Appl. No. 12/430,912 Office Action dated Jun. 15, 2011.

U.S. Appl. No. 12/430,912 Office Action dated Nov. 2, 2011.

Raindel et al., U.S. Appl. No. 13/471,558, filed May 15, 2012.

Infiniband Trade Association, "InfiniBandTM Architecture Specification", vol. 1, Release 1.21, Nov. 2007.

Shah et al., "Direct Data Placement over Reliable Transports", IETF Network Working Group, RFC 5041, Oct. 2007.

Culley et al., "Marker PDU Aligned Framing for TCP Specification", IETF Network Working Group, RFC 5044, Oct. 2007.

"MPI: A Message-Passing Interface Standard", Version 2.2, Message Passing Interface Forum, Sep. 4, 2009.

Eran et al., U.S. Appl. No. 13/628,155, filed Sep. 27, 2012.

Bloch et al., U.S. Appl. No. 13/628,187, filed Sep. 27, 2012.

Raindel et al., U.S. Appl. No. 13/628,075, filed Sep. 27, 2012.

Solomon R., "IOV 1.1 Update and Overview", LSI Corporation, Member I/O Virtualization Workgroup, PCI-SIG, PCI Express, 45 pages, 2010.

Hummel M., "IO Memory Management Hardware Goes Mainstream", AMD Fellow, Computation Products Group, Microsoft WinHEC, 7 pages, 2006.

Welsh et al., "Incorporating Memory Management into User-Level Network Interfaces", Department of Computer Science, Cornell University, Technical Report TR97-1620, 10 pages, Feb. 13, 1997.

U.S. Appl. No. 13/471,558 Office Action dated Jun. 4, 2014.

U.S. Appl. No. 13/471,558 Office Action dated Mar. 4, 2015.

* cited by examiner

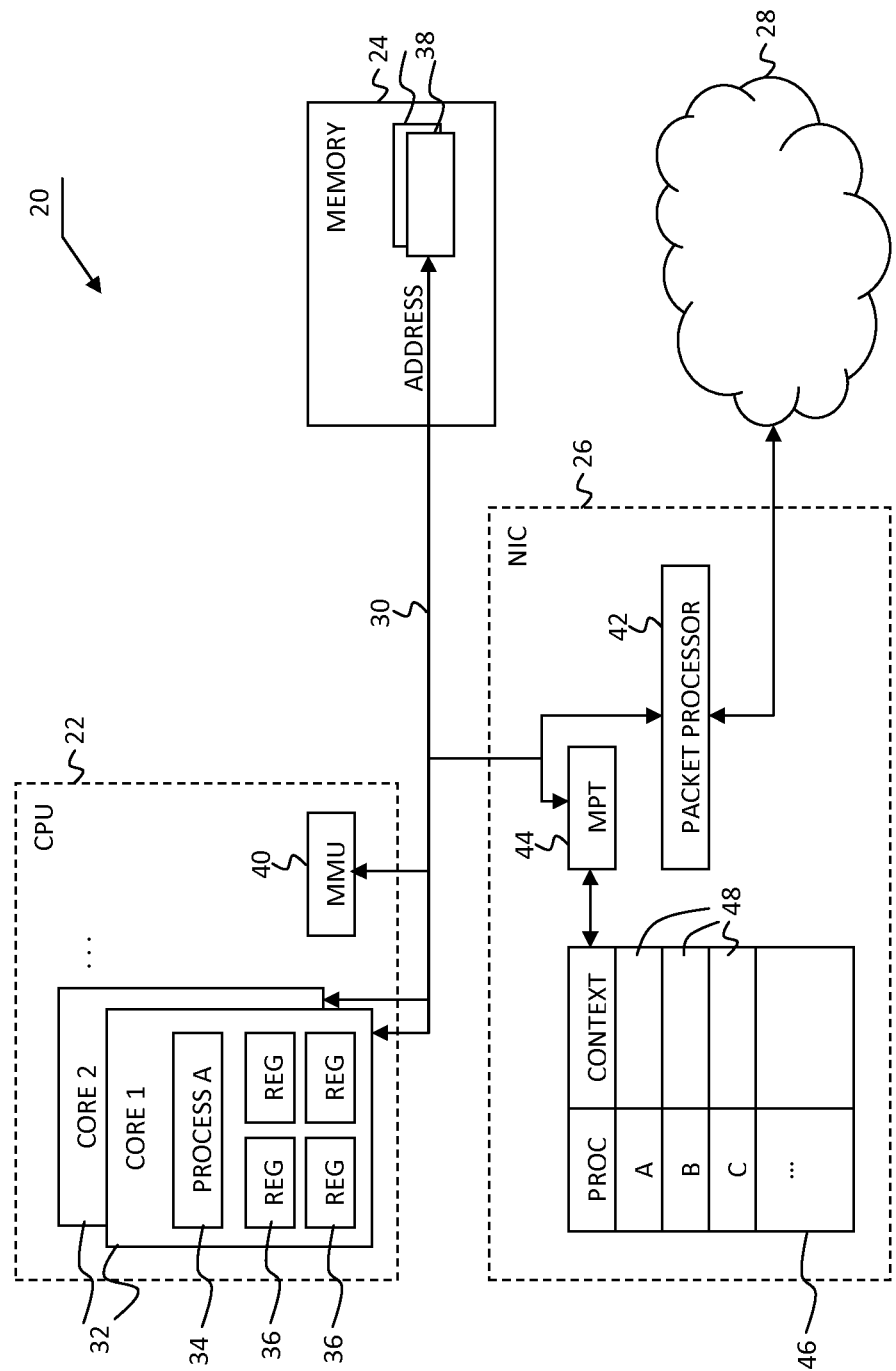

SHARING ADDRESS TRANSLATION BETWEEN CPU AND PERIPHERAL DEVICES

FIELD OF THE INVENTION

The present invention relates generally to computer systems, and particularly to management of virtual memory in such systems.

BACKGROUND

Computer operating systems use virtual memory techniques to permit application programs to address a contiguous working memory space, even when the corresponding physical (machine) memory space is fragmented and may overflow to disk storage. The virtual memory address space is typically divided into pages, and the computer memory management unit (MMU) uses page tables to translate the virtual addresses of the application program into physical addresses. The virtual address range may exceed the amount of actual physical memory, in which case disk storage space is used to save ("swap out") virtual memory pages that are not currently active. When an application attempts to access a virtual address that is absent from the physical memory, the MMU raises a page fault exception (commonly referred to simply as a "page fault"), which causes the operating system to swap the required page back from the disk into the memory.

Input/output (I/O) devices usually use physical memory addresses in accessing host memory, but some virtual memory addressing techniques for I/O have been developed. For example, the PCI-SIG organization (Beaverton, Oreg.) has developed a set of I/O Virtualization (IOV) specifications. The PCI-SIG Address Translation Services (ATS) specifications, including ATS 1.0 and 1.1, provide a set of transactions for PCI Express components to exchange and use translated addresses in support of native I/O virtualization. These specifications can be used in conjunction with system virtualization technologies to allow multiple operating systems running simultaneously within a single computer to natively share PCI Express® devices.

Welsh et al., in a paper entitled, "Incorporating Memory Management into User-Level Network Interfaces" (Department of Computer Science, Cornell University, Technical Report TR97-1620, Feb. 13, 1997), describe an architecture in which a network interface (NI) performs address translation between physical and virtual address spaces. The paper presents an extension to the U-Net user-level network architecture (U-Net/MM) that allows messages to be transferred directly to and from any part of the address space of an application. This capability is achieved by integrating a translation look-aside buffer into the network interface and coordinating its operation with the virtual memory subsystem of the computer operating system. This mechanism is said to allow network buffer pages to be pinned and unpinned dynamically.

Some virtual memory addressing techniques for I/O have been described in the patent literature. For example, U.S. Pat. No. 6,321,276, whose disclosure is incorporated herein by reference, describes methods and systems for processing I/O requests including virtual memory addresses. A "recoverable I/O request processor" translates virtual memory addresses to physical memory addresses utilizing translation tables local to an I/O device. If a local translation fails, the I/O request processor requests virtual address mapping information from the operating system.

U.S. Patent Application Publication 2004/0221128, whose disclosure is incorporated herein by reference, describes virtual-to-physical memory mapping in network interfaces. A plurality of processing nodes in a network have respective addressable memories and respective network interfaces. Each network interface includes a memory management unit with at least one mapping table for mapping virtual addresses to the physical addresses of the addressable memory of the respective processing node.

U.S. Pat. No. 8,255,475, whose disclosure is incorporated herein by reference, describes an input/output (I/O) device that includes a host interface, for connection to a host device having a memory, and a network interface, which is configured to receive, over a network, data packets associated with I/O operations directed to specified virtual addresses in the memory. Packet processing hardware is configured to translate the virtual addresses into physical addresses and to perform the I/O operations using the physical addresses.

SUMMARY

Embodiments of the present invention that are described hereinbelow provide devices and methods for improved management of memory resources.

There is therefore provided, in accordance with an embodiment of the present invention, a method for memory access, which includes maintaining in a host memory, under control of a host operating system running on a central processing unit (CPU), respective address translation tables for multiple processes executed by the CPU. A work item that is associated with a given process, having a respective address translation table in the host memory, and specifies a virtual memory address, is received in a peripheral device. The virtual memory address is translated, in the peripheral device, into a physical memory address by accessing the respective address translation table of the given process in the host memory. The work item is executed in the peripheral device by accessing data at the physical memory address in the host memory.

Typically, each of the address translation tables in the host memory has a respective base address, and translating the virtual memory address includes accessing, by the peripheral device, a page table entry at the respective base address for the given process. In some embodiments, the method includes maintaining, in the peripheral device, records of respective base addresses for the multiple processes, wherein accessing the page table entry includes reading the respective base address from the records in the peripheral device in order to access the page table entry. One or more of the records maintained in the peripheral device may be associated with respective ones of the processes that are swapped out of execution by the CPU. Additionally or alternatively, accessing the page table entry includes identifying the page table entry using a process identifier of the given process.

In some embodiments, translating the virtual memory address includes detecting, in the peripheral device, that a page containing the physical memory address is swapped out of the host memory, and invoking a page fault so as to cause the page to be swapped into the host memory. Additionally or alternatively, executing the work item includes accessing the data in the host memory while the given process that is associated with the work item is swapped out of execution by the CPU.

In a disclosed embodiment, the peripheral device includes an input/output (I/O) device, such as a network interface controller (NIC). Receiving the work item typically includes receiving, at the NIC, a data packet transmitted over a network, and processing the data packet so as to identify the given process to which the data packet is directed. Processing the data packet may include reading from the data packet at least one data item, selected from a group of data items consisting of a queue pair number and a memory key, and identifying the given process responsively to the at least one data item.

There is also provided, in accordance with an embodiment of the present invention, computing apparatus, including a host memory and a central processing unit (CPU), which is configured to run a host operating system, which maintains, in the host memory, respective address translation tables for multiple processes executed by the CPU. A peripheral device is configured to receive a work item that is associated with a given process, having a respective address translation table in the host memory, and specifies a virtual memory address, to translate the virtual memory address into a physical memory address by accessing the respective address translation table of the given process in the host memory, and to execute the work item by accessing data at the physical memory address in the host memory.

The present invention will be more fully understood from the following detailed description of the embodiments thereof, taken together with the drawings in which:

BRIEF DESCRIPTION OF THE DRAWING

FIG. 1 is a block diagram that schematically illustrates a host computer with a network interface controller (NIC), in accordance with an embodiment of the present invention.

DETAILED DESCRIPTION OF EMBODIMENTS

I/O devices that are known in the art typically use "pinned" memory, in which page faults are avoided by pre-assigning a range of physical memory to the I/O device, or possibly to a client process that communicates with the I/O device. In some systems that are known in the art, such as the systems described above in the Background section, an I/O device may contain its own set of memory translation tables. This approach enables the device to execute I/O operations that are specified in terms of virtual memory addresses, but it still requires considerable coordination between the I/O device and the host operating system—with attendant overhead and data transfer latency—to handle page faults and coordinate and update the respective translation tables.

Embodiments of the present invention permit a peripheral device, such as a NIC or other I/O device, to share and access the same set of address translation tables that is used and maintained by the host operating system for CPU operations. For this purpose, the peripheral device may store respective reference information (in the form of base address pointers, for example) to the address translation tables that are maintained in host memory for some or all of the processes being executed by the CPU. When the peripheral device receives a work item (such as a data transfer request) that is associated with a given process and is directed to a virtual memory address, the peripheral device is able to directly access the appropriate address translation table in host memory, using the stored reference information, in order to execute the work item. This novel approach to address translation enables the peripheral device, in some embodiments, to effectively present itself to the CPU as though it had multiple, specialized processing cores (for example, I/O or graphic processors), with a dedicated core for each process executing on the CPU.

FIG. 1 is a block diagram that schematically shows components of a host computer 20, in accordance with an embodiment of the present invention. Computer 20 comprises a CPU 22 and a host memory 24, which typically comprises dynamic random access memory (DRAM). The computer also comprises one or more peripheral devices, including I/O devices, such as a NIC 26, which is connected to a packet network 28, such as an InfiniBand™ or Ethernet™ switch fabric. Additionally or alternatively, computer 20 may comprise other I/O devices, such as a storage controller, as well as other sorts of peripheral devices, such as a graphics processing unit (GPU). (In this context, however, components of the CPU complex, such as the memory management unit and bus controller, are not considered to be "peripheral devices.")

CPU 22 and NIC 26 are typically implemented in one or more integrated circuit (IC) chips or an IC chip set. These chips communicate with memory 24 via a host memory interface 30. In embodiments of the present invention, it is advantageous that NIC 26 be connected to the same memory interface 30 as CPU 22. NIC 26 may then be configured to appear to processes running on CPU 22 as an additional, specialized processing core (or actually, many such cores—effectively a dedicated core for each process) in the computer. Alternatively, it is also possible to connect the NIC and other peripheral devices to the CPU and memory via a bus, such as a PCI Express® bus or a proprietary memory bus. In such settings, driver software could provide NIC 26 with pointers to the memory translation tables, or the NIC might access such pointers in some other manner.

CPU 22 typically comprises multiple cores 32, each comprising an instruction processor 34 and multiple memory registers 36, as well as other components that are known in the art. While computer 20 is running, each core 32 typically executes a respective process, among multiple processes executed by the computer. Each process is identified in the computer by a unique process identifier (ID), represented in the FIGURE by the arbitrary process ID values A, B, C, . . . . The processes executed by the computer include both operating system and application processes, and may include both native and virtual machine processes, as are known in the art.

Memory 28 holds program instructions and application data, as well as metadata structures that are accessed and used by CPU 22 in the course of process execution. Typically, computer 20 has more processes in execution simultaneously than CPU 22 has processing cores 32. Therefore, CPU 22 swaps processes in and out of cores 32, as is known in the art. When a process is swapped into a given core 32, the process context is transferred from memory 24 to registers 36 in the core; and when the process is swapped out, the register values are typically copied back to the memory.

In general, the processes executing on computer 20 use virtual memory addressing, as explained above. For this purpose, memory 24 stores an address translation table 38 for each process, and this table is used by the operating system and/or by the memory management unit (MMU) of the CPU in translating virtual addresses specified by the process into physical addresses in the memory. (For processes running on virtual machines, there are generally two stages of address translation: from virtual to "physical" addresses in the memory space of the virtual machine, and from these "physical" addresses to actual physical machine addresses in memory 24; and each of these stages has its own address translation table.) The context of each process typically includes the base address of the address translation table 38, which is used by CPU 22 in accessing the page table entries in table 38. While a process is executing on a given core 32, this base address value for the process is generally held in one of registers 36 of the core (for example, Control Register 3 (CR3) in Intel® x86 processors). Alternatively or additionally, the base address value for each process may be derived by CPU 22 using a predetermined algorithm, as an arithmetic function of the process ID value, for example.

During operation of computer 20, pages of virtual memory are typically swapped between memory 24 and a mass-storage device, such as a disk (not shown). When a process attempts to access a page that is swapped out of memory 24, a memory management unit 40 raises a page fault, which causes the operating system to swap the desired page into memory 24. The operating system marks entries in tables 38 to indicate which pages in memory 24 have been modified, and thus should be copied to disk when they are swapped out.

NIC 26 comprises packet processing circuitry 42, which receives and processes incoming packets from network 28 and generates outgoing packets for transmission over the network. Circuitry 42 performs protocol processing functions (such as medium access control [MAC] and/or transport-layer functions) in accordance with instructions received from client processes running on CPU 22. These functions include, for example, constructing data packets containing data gathered from memory 24 for transmission over network 28, as well as receiving and processing incoming packets from network 28 and scattering the data contained in the packets to memory 24. The functions of the HCA are typically implemented in dedicated hardware circuits, which may be based on those described, for example, in U.S. Pat. No. 8,051,212, whose disclosure is incorporated herein by reference, and in the above-mentioned U.S. Pat. No. 8,255,475.

Client processes running on CPU 22 may communicate with the transport layer of network 28 via NIC 26 by manipulating a service instance (known in InfiniBand parlance as a "queue pair" (QP)), which is made up of a send queue and a receive queue. Each QP has a respective QP context, which may be held in NIC 26 and/or in memory 24, and which is used and updated by the NIC in the course of processing communications on that QP. A given client process may open and use multiple QPs simultaneously, and the QP context will typically contain the process ID of the process with which the QP is associated.

To send and receive communications over network 28, a client process initiates work requests (WRs), which causes work items, referred to as work queue elements (WQEs), to be placed in the queues of the appropriate QPs for execution by the NIC. More generally, in the context of the present description and in the claims, any sort of task to be carried out by the NIC (or by another peripheral device) may be regarded as a "work item," and work items may be invoked by any sort of message or event directed to the NIC (or other peripheral device). In the case of NIC 26, such work items may be initiated either by CPU 22 or by remote entities that communicate with the NIC over network 28.

Message types transmitted over network 28 may include, inter alia, remote direct memory access (RDMA) Write requests and Send requests, which invoke work items that cause NIC 26 to write data to a specified address in memory 24; and RDMA Read requests, which invoke work items to cause the NIC to read data from a specified address in memory 24 and return it to the requester over the network. RDMA Read and Write requests specify the memory range to be accessed by the NIC in memory 24, whereas Send requests cause the NIC to use the memory range specified in a receive WQE posted by the process to which the Send request is directed.

In the present embodiment, the memory range for at least some work items is assumed to be specified in terms of virtual memory addresses in the virtual address space of the client processes with which the work items are respectively associated. To service these work items, a memory protection and translation (MPT) processor 44 in NIC 26 reads the appropriate address translation table 38 for the client process in question from memory 24, and uses the information in the table to translate the specified virtual addresses into physical (machine) addresses in the memory. If MPT processor 44 detects that the memory page containing a translated physical address of this sort is swapped out of memory 24, it may invoke a page fault so as to cause the page to be swapped into the host memory. Efficient methods for handling such page faults are described, for example, in the above-mentioned U.S. Pat. No. 8,255,475 and in U.S. patent application Ser. No. 13/628,075, filed Sep. 27, 2012, which is assigned to the assignee of the present patent application and whose disclosure is incorporated herein by reference.

To translate a virtual memory address associated with a given process, MPT processor 44 uses the respective base address of the address translation table 38 for this particular process to access the appropriate page table entry in the table. For this purpose, the MPT processor may use a table 46 of process context records that is maintained by NIC 26. Additionally or alternatively, table 46 may be held in memory 24 and is accessed as required by NIC 26 (which may cache at least some of the table entries). In the example shown in FIG. 1, each record 48 is keyed by the respective process ID and contains, inter alia, the base address of the address translation table for the process. Typically, table 46 contains records 48 not only for processes that are currently running (swapped in) on one of cores 32, but also processes that are currently swapped out of execution by the CPU. In other words, the number of records in table 46 may be considerably greater than the number of cores 32 in CPU 22.

In an alternative embodiment, as noted above, the base address for the translation table for each process may be derived algorithmically, from the process ID, for example. In this case, MPT processor 44 may use the same algorithm as CPU 22 to derive the base address from the process ID, and it may then not be necessary to maintain table 46 in NIC 26.

NIC 26 may identify the process associated with a given work item—and hence may find the appropriate base address for address translation—without necessarily receiving the work item directly from the process. For example, upon receiving a data packet transmitted over network 28, packet processing circuitry 42 may identify the target process to which the packet is directed based on the contents of the data packet itself. Specifically, circuitry 42 may extract a relevant data item, such as a destination QP number and/or a memory key and/or a process ID, from the incoming packet, typically from transport header fields that are assigned to contain these data items. If the process ID is not contained in the packet itself, circuitry 42 may then check the context data maintained by NIC 26 for the given QP or memory key in order to identify the target process with which the QP and/or memory key is associated. (Circuitry 42 may check the context data even if the process ID is transmitted in the packet, for example to perform a security check.) Once the process ID has been extracted, MPT processor 44 is able (using table 46, for example) to find the appropriate base address for table 38.

Upon finding the base address in this manner, MPT processor 44 accesses table 38 to translate the virtual address (specified in the packet itself or in a receive WQE, for example) to the physical address in memory 24 to which the packet data are to be written. Packet processing circuitry 42 writes the data to this address and may alert the target process, by raising an interrupt, for example. MPT processor 44 may also mark page table entries in table 38 to indicate pages from which data have been read and/or pages to which new data have been written.

CPU 22 may similarly maintain one or more internal tables of base addresses for address translation, like table 46. The CPU will then be in a position to perform address translation for more processes than there are cores 32, i.e., not only for processes that are swapped into operation in the cores, but also processes that are swapped out. This sort of extended address translation may be useful, for example, in process-to-process messaging.

Although the embodiment shown in FIG. 1 and described above relates specifically to address translation performed by a NIC, the principles of the present invention may similarly be implemented, mutatis mutandis, in other I/O devices, such as storage controllers, as well as in other types of peripheral devices, such as a GPU. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for memory access, comprising:
maintaining in a host memory, under control of a host operating system running on a central processing unit (CPU), respective address translation tables for multiple processes executed by the CPU, and a table of process context records which indicates base addresses of translation tables for processes running on the CPU;
receiving, in a peripheral device, a work item that is associated with a given process, having a respective address translation table in the host memory, and specifies a virtual memory address;
translating, in the peripheral device, the virtual memory address into a physical memory address by accessing the table of process context records in the host memory and the respective address translation table of the given process in the host memory; and
executing the work item in the peripheral device by accessing data at the physical memory address in the host memory.

2. The method according to claim 1, wherein each of the address translation tables in the host memory has a respective base address, and wherein translating the virtual memory address comprises accessing, by the peripheral device, a page table entry at the respective base address for the given process.

3. The method according to claim 2, wherein accessing the page table entry comprises identifying the page table entry using a process identifier of the given process.

4. The method according to claim 1, wherein one or more of the process context records are associated with respective ones of the processes that are swapped out of execution by the CPU.

5. The method according to claim 1, wherein translating the virtual memory address comprises detecting, in the peripheral device, that a page containing the physical memory address is swapped out of the host memory, and invoking a page fault so as to cause the page to be swapped into the host memory.

6. The method according to claim 1, wherein executing the work item comprises accessing the data in the host memory while the given process that is associated with the work item is swapped out of execution by the CPU.

7. The method according to claim 6, wherein maintaining the address translation tables comprises maintaining the currency of the tables of all processes handled by the CPU, including those currently swapped out of the CPU.

8. The method according to claim 1, wherein the peripheral device comprises an input/output (I/O) device.

9. The method according to claim 8, wherein the I/O device comprises a network interface controller (NIC), and wherein receiving the work item comprises receiving, at the NIC, a data packet transmitted over a network, and processing the data packet so as to identify, by the NIC, the given process to which the data packet is directed.

10. The method according to claim 9, wherein processing the data packet comprises reading from the data packet at least one data item, selected from a group of data items consisting of a queue pair number and a memory key, and identifying the given process responsively to the at least one data item.

11. The method according to claim 1, wherein accessing the table of process context records in the host memory comprises caching at least some of the table of process context records in the peripheral device.

12. Computing apparatus, comprising:
a host memory;
a central processing unit (CPU), which is configured to run a host operating system, which maintains, in the host memory, respective address translation tables for multiple processes executed by the CPU and a table of process context records which indicates base addresses of translation tables for processes running on the CPU; and
a peripheral device, which is configured to receive a work item that is associated with a given process, having a respective address translation table in the host memory, and specifies a virtual memory address, to translate the virtual memory address into a physical memory address by accessing the table of process context records in the host memory and the respective address translation table of the given process in the host memory, and to execute the work item by accessing data at the physical memory address in the host memory.

13. The apparatus according to claim 12, wherein each of the address translation tables in the host memory has a respective base address, and wherein the peripheral device is configured to access a page table entry at the respective base address for the given process in order to translate the virtual memory address.

14. The apparatus according to claim 13, wherein the peripheral device is configured to identify the page table entry using a process identifier of the given process.

15. The apparatus according to claim 12, wherein one or more of the process context records are associated with respective ones of the processes that are swapped out of execution by the CPU.

16. The apparatus according to claim 12, wherein the peripheral device is configured to detect that a page containing the physical memory address is swapped out of the host memory, and to invoke a page fault so as to cause the page to be swapped into the host memory.

17. The apparatus according to claim 12, wherein the peripheral device is configured to access the data in the host memory in order to execute the work item while the given process that is associated with the work item is swapped out of execution by the CPU.

18. The apparatus according to claim 12, wherein the peripheral device comprises an input/output (I/O) device.

19. The apparatus according to claim 18, wherein the I/O device comprises a network interface controller (NIC), wherein the work item is invoked by a data packet transmitted over a network and received by the NIC, and wherein the NIC is configured to process the data packet so as to identify the given process to which the data packet is directed.

20. The apparatus according to claim 19, wherein the NIC is configured to read from the data packet at least one data item, selected from a group of data items consisting of a queue pair number and a memory key, and to identify the given process responsively to the at least one data item.

* * * * *